(No Model.)

G. B. GODDARD.
MALLET.

No. 414,808. Patented Nov. 12, 1889.

Witnesses:
Walter E. Lombard,
Henry H. Kendall

Inventor:
George B. Goddard,
by N. C. Lombard
Attorney.

UNITED STATES PATENT OFFICE.

GEORGE B. GODDARD, OF BROCKTON, MASSACHUSETTS.

MALLET.

SPECIFICATION forming part of Letters Patent No. 414,808, dated November 12, 1889.

Application filed August 2, 1889. Serial No. 319,508. (No model.)

*To all whom it may concern:*

Be it known that I, GEORGE B. GODDARD, of Brockton, in the county of Plymouth and State of Massachusetts, have invented a new and useful Improvement in Mallets, of which the following, taken in connection with the accompanying drawings, is a specification.

My invention relates to that class of mallets in which the operative surfaces of the mallet are composed of a series of disks or rings of rawhide placed side by side and compressed firmly together and clamped between metallic collars, and is an improvement upon the invention patented to me January 7, 1879, and numbered 211,149; and it consists in certain novel features of construction, arrangement, and combination of parts, which will be readily understood by reference to the description of the drawings and to the claims hereinafter given, and in which my invention is clearly pointed out.

Figure 1:
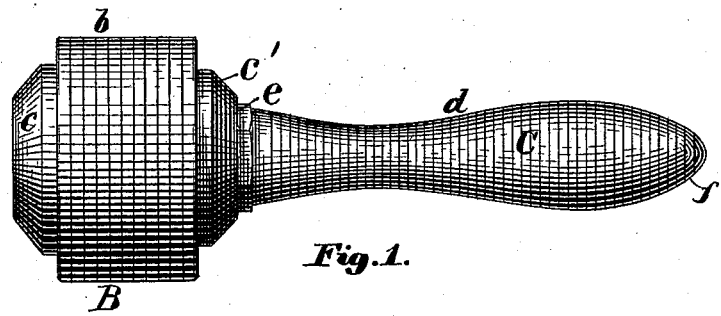
Figure 2:
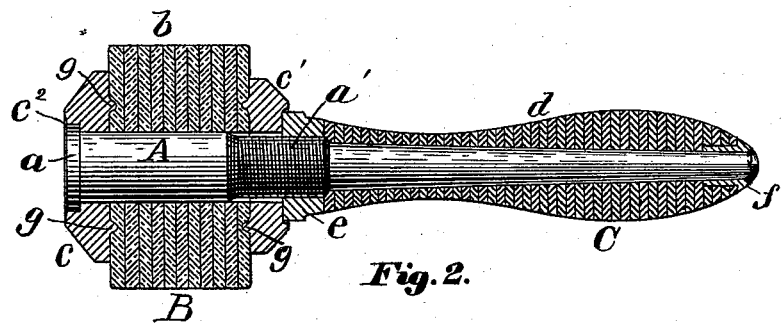
Figure 3:
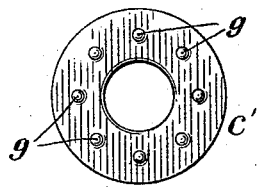
Figure 4:
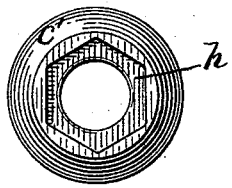

Figure 1 of the drawings is an elevation of a mallet, illustrating my invention. Fig. 2 is a longitudinal section through the mallet and handle, with the clamping-bolt shown in elevation. Fig. 3 is an elevation of the inner face of a clamping-collar for securing the rawhide rings together, and Fig. 4 is an elevation of the outer face of the collar at the handle end of the mallet.

In the drawings, A is the central bolt, provided at one end with the collar or head $a$, and having formed thereon at the proper distance from said head the threaded section $a'$, and having that portion within the handle reduced in size and made tapering, as shown.

B is the mallet-head, composed of a series of rawhide disks or rings $b$ and the two metal collars $c$ and $c'$; and C is the handle, composed of a series of leather disks or rings $d$, the nut $e$, and the collar $f$. The collar $c$ has formed in its outer surface a recess $c^2$ to receive the head $a$ of the bolt A, which head may be round, square, or hexagonal or octagonal in shape, but should be so connected to said collar $c$ that said collar could not turn on the bolt A. The inner faces of both the collars $c$ and $c'$ are provided with projecting points $g$, which are pressed into the contiguous rawhide rings $b$, as shown in Fig. 2. The collar $c'$ has formed in its outer face a recess $h$ of a shape and size corresponding substantially to the size and shape in plan of the nut $e$, as shown in Fig. 4.

In making up the mallet the bolt A is passed through the collar $c$, the disks or rings of rawhide $b$ are placed in position around said bolt and resting on the collar $c$, the collar $c'$ is placed on the rawhide disks, and the whole is subjected to a heavy pressure to compact the rawhide disks and force the points $g$ into the rawhide. The nut $e$ is then screwed down upon the collar $c'$ until it can be screwed no farther and its sides coincide with the sides of the recess $h$ in the collar $c'$, when the pressure is removed from the collars $c$ and $c'$, permitting the rawhide to expand until the bottom of the recess $h$ in the collar $c'$ comes in contact with the inner face of the nut $e$, as shown in Fig. 2, thus locking said nut against unscrewing. The leather disks $d$ are then placed in position on the tapered portion of the bolt A, the collar $f$ is placed in position, and the end of the bolt A is riveted down thereon, and the mallet is completed and ready for use.

What I claim as new, and desire to secure by Letters Patent of the United States, is—

1. A mallet composed of the bolt A, provided with the head $a$ and thread $a'$, the collars $c$ and $c'$, provided, respectively, with the recesses $c^2$ and $h$, the rawhide disks $b$, and the nut $e$, having a shape and size substantially corresponding to the shape and size of the recess $h$, all combined and arranged to operate substantially as described.

2. In a mallet, the combination of the bolt A, provided with the head $a$ and the thread $a'$, the collars $c$ and $c'$, provided, respectively, with the recesses $c^2$ and $h$ and provided on their inner surfaces with projecting points $g$, the rawhide disks $b$, and the nut $e$, having a shape and size corresponding substantially to the size and shape of the recess $h$ in the collar $c'$.

In testimony whereof I have signed my name to this specification, in the presence of two subscribing witnesses, on this 29th day of July, A. D. 1889.

GEORGE B. GODDARD.

Witnesses:
 HENRY H. KENDALL,
 N. C. LOMBARD.